United States Patent

Krapcho

[11] 3,869,447
[45] Mar. 4, 1975

[54] 2,3,4,5-TETRAHYDRO-4-PHENYL-1H-1,4-BENZODIAZEPINE-1-CARBOXIMIDAMIDE AND RELATED COMPOUNDS

[75] Inventor: John Krapcho, Somerset, N.J.
[73] Assignee: E. R. Squibb & Sons, Inc., Princeton, N.J.
[22] Filed: May 13, 1974
[21] Appl. No.: 469,172

[52] U.S. Cl. ..... 260/239 BD, 260/239.3 D, 424/244
[51] Int. Cl............................................ C07d 53/06
[58] Field of Search............................... 260/239 BD

[56] References Cited
UNITED STATES PATENTS
3,481,921  12/1969  Field et al. .................... 260/239 BD
3,812,103  5/1974  Metlesics et al.............. 260/239 BD Primary Examiner—Alton D. Rollins
Attorney, Agent, or Firm—Lawrence S. Levinson; Merle J. Smith; Stephen B. Davis

[57] ABSTRACT

Compounds of the formula and their acid-addition and quaternary salts

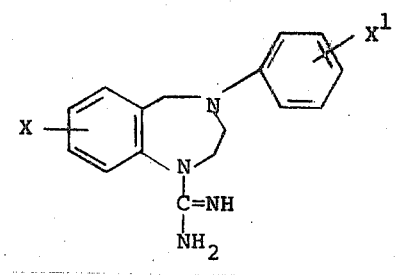

wherein X and $X^1$ are independently selected from hydrogen, lower alkyl, lower alkoxy, halo, and trifluoromethyl are disclosed. These compounds are useful as hypotensive agents.

7 Claims, No Drawings

2,3,4,5-TETRAHYDRO-4-PHENYL-1H-1,4-BENZODIAZEPINE-1-CARBOXIMIDAMIDE AND RELATED COMPOUNDS

This invention relates to new compounds of the formula

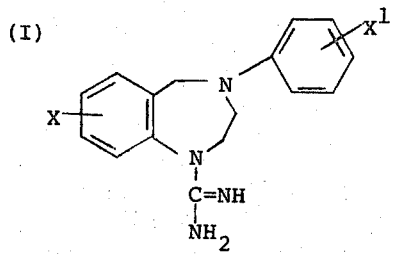

and their acid-addition and quaternary ammonium salts which are useful as hypotensive agents.

X and $X^1$ represent hydrogen, lower alkoxy, lower alkyl, halo, or trifluoromethyl.

The terms "lower alkyl" and "lower alkoxy" as employed herein include both straight and branched chain radicals of less than eight carbn atoms, for example, methyl, ethyl, propyl, isopropyl, butyl, isobutyl, t-butyl, methoxy, ethoxy, propoxy, isopropoxy, and the like. Preferred are lower alkyl and lower alkoxy of 1 to 4 carbon atoms.

The compounds of formula I form pharmaceutically acceptable salts which are also part of this invention. The salts include acid-addition salts and the quaternary ammonium salts. The bases of formula I form acid addition salts by reaction with a variety of acids. Acids useful for preparing these acid-addition salts include, inter alia, inorganic acids, such as the hydrohalic acids (e.g. hydrochloric and hydrobromic acid), sulfuric acid, nitric acid, and phosphoric acid, and organic acids such as maleic, fumaric, tartaric, citric, acetic, benzoic, 2-acetoxybenzoic, salicyclic, succinic, nicotinic, methanesulfonic or cyclohexanesulfamic. The quaternary ammonium salts include those formed with alkyl halide (e.g. methyl chloride, isobutyl bromide, dodecyl chloride and cetyl iodide), benzyl halides (e.g. benzyl chloride) and dilower alkyl sulfates (e.g. dimethyl sulfate) by a conventional quaternization reaction.

DETAILED DESCRIPTION

The compounds of formula I are prepared by treating the appropriate substituted 3,4-dihydro-4-(substituted phenyl)-1H-1,4-benzodiazepine-2,5-dione of formula

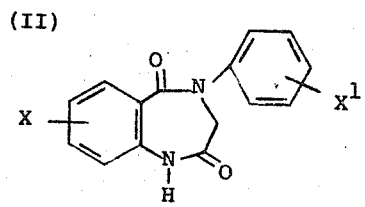

with a strong reducing agent such as lithium aluminum hydride or diborane to produce the substituted 2,3,4,5-tetrahydro-4-(substituted phenyl)-1H-1,4-benzodiazepine of formula

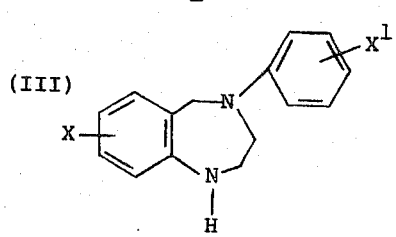

The compound of formula III is perferably converted to its salt form such as the hydrochloric salt, sulfate salt, phosphate salt, etc. and then reacted by heating with cyanamide ($H_2NCN$) in an organic solvent, preferably an alcohol of up to four carbon atoms at a temperature of about 40°C to about 120°C, preferably at about the reflux temperature of the solvent, for about 6 to about 48 hours, preferably about 24 hours, to produce the compounds of formula I.

The starting materials of formula II are known compounds prepared as described in U.S. Pat. No. 3,173,912 issued on Mar. 16, 1965 to Krapcho whose disclosure is incorporated herein.

The compounds of formula I including the acid-addition and quaternary salts having a lowering effect on blood pressure and are useful in the treatment of hypertension in mammalian species, for example, rats, cats, dogs, etc., when administered in amounts ranging from about 0.5 mg. to about 50 mg. per kg. of body weight per day. A preferred dosage regimen for optimum results would be from about 1.0 mg. to about 10 mg. per kg. of body weight per day in a single dose or divided into a series of doses.

For this purpose a compound or mixture of compounds of formula I, non-toxic pharmaceutically acceptable acid addition or quaternary ammonium salts thereof may be administered orally or parenterally in a conventional dosage form such as a tablet, capsule, injectable or the like. These may be conventionally formulated in an oral or parenteral dosage form by compounding with a conventional vehicle, excipient, binder, preservative, stabilizer, flavor or the like as called for by accepted pharmaceutical practice.

The following examples are illustrative of the invention. All temperatures are expressed on the centigrade scale.

EXAMPLE 1

2,3,4,5-Tetrahydro-4-phenyl-1H-1,4-benzodiazepine-1-carboximidamide, hydrochloride a. 2,3,4,5-Tetrahydro-4-phenyl-1H-1,4-benzodiazepine 15.9 g. of 4-phenyl-3,4-dihydro-1H-1,4-benzodiazepine-2,5-dione (prepared as set forth in example 1 of U.S. Pat. No. 3,173,912) is added to a stirred suspension of 5.4 g. of lithium aluminium hydride in 300 ml. of tetrahydrofuran. The slurry is refluxed for 7 hours, cooled and treated portionwise with 6 ml. of water and then with a solution of 3 g. of NaOH in 20 ml. of water. The mixture is filtered and the solvent evaporated to give 14.6 g. of pale yellow semi-crystalline material. This material is digested in 50 ml. of hot diisopropyl ether, cooled and filtered to give 8.8 g. (62%) of nearly colorless 2,3,4,5-tetrahydro-4-phenyl-1H-1,4-benzodiazepine; m.p. 101°–104°. A small sample is crystallized from ethanol and melts at 103°–105°.

b. 2,3,4,5-Tetrahydro-4-phenyl-1H-1,4-benzodiazepine-1-carboximidamide, hydrochloride A suspension of 6.2 g. (0.0277 mole) of the product from part (a) in 100 ml. of ethanol is treated with one equivalent of ethanolic HCl. 6.0 g. of cyanamide ($H_2NCN$) is added to the suspension and the resulting mixture is heated and refluxed for 24 hours, cooled, diluted to 450 ml. with ether, and filtered to yield 2.6 g. (31%) of nearly colorless solid 2,3,4,5-tetrahydro-4-phenyl-1H-1,4-benzodiazepine-1-carboximidamide hydrochloride; 246°–248° (red melt). 2.0 g. of this material is crystallized from 30 ml. of ethanol to give 1.3 g. (20%) of nearly colorless solid 2,3,4,5-tetrahydro-4-phenyl-1H-1,4-benzodiazepine-1-carboximidamide hyrochloride; 249°–251° (red melt).

EXAMPLES 2 to 24

Substituted-2,3,4,5-tetrahydro-4-(substituted phenyl)-1H-1,4-benzodiazepine-1-carboximidamide, hydrochloride By varying the reactants according to the procedure in U.S. Pat. No. 3,173,912 the following substituted-4-(substituted phenyl)-3,4-dihydro-1H-1,4-benzodiazepine-2,5-diones are prepared (i.e. react the appropriate 3- or 4- or 5- or 6-substituted-2-nitrobenzoyl halides and the appropriate substituted phenylglycines)

2. 6-chloro-3,4-dihydro-4-phenyl-1H-1,4-benzodiazepine-2,5-dione
3. 7-bromo-3,4-dihydro-4-phenyl-1H-1,4-benzodiaepine-2,5-dione
4. 8-fluoro-3,4-dihydro-4-phenyl-1H-1,4-benzodiazepine-2,5-dione
5. 9-trifluoromethyl-3,4-dihydro-4-phenyl-1H-1,4-benzodiazepine-2,5-dione
6. 6-methyl-3,4-dihydro-4-phenyl-1H-1,4-benzodiazepine-2,5-dione
7. 7-ethyl-3,4-dihydro-4-phenyl-1H-1,4-benzodiazepine-2,5-dione
8. 9-propyl-3,4-dihydro-4-phenyl-1H-1,4-benzodiazepine-2,5-dione
9. 6-t-butyl-3,4-dihydro-4-phenyl-1H-1,4-benzodiazepine-2,5-dione
10. 6-methoxy-3,4-dihydro-4-phenyl-1H-1,4-benzodiazepine-2,5-dione
11. 8-ethoxy-3,4-dihydro-4-phenyl-1H-1,4-benzodiazepine-2,5-dione
12. 9-i-propoxy-3,4-dihydro-4-phenyl-1H-1,4-benzodiazepine-2,5-dione
13. 6-t-butoxy-3,4-dihydro-4-phenyl-1H-1,4-benzodiazepine-2,5-dione
14. 3,4-dihydro-4-(4-chlorophenyl)-1H-1,4-benzodiazepine-2,5-dione
15. 3,4-dihydro-4-(2-bromophenyl)-1H-1,4-benzodiazepine-2,5-dione
16. 3,4-dihydro-4-(4-trifluoromethylphenyl)-1H-1,4-benzodiazepine-2,5-dione
17. 3,4-dihydro-4-(4-methylphenyl)-1H-1,4-benzodiazepine-2,5-dione
18. 3,4-dihydro-4-(3-ethylphenyl)-1H-1,4-benzodiazepine-2,5-dione
19. 3,4-dihydro-4-(2-methoxyphenyl)-1H-1,4-benzodiazepine-2,5-dione
20. 3,4-dihydro-4-(4-ethoxyphenyl-1H-1,4-benzodiazepine-2,5-dione
21. 6-chloro-3,4-dihydro-4-(4-methylphenyl)-1H-1,4-benzodiazepine-2,5-dione
22. 7-chloro-3,4-dihydro-4-(4-methoxyphenyl)-1H-1,4-benzodiazepinen-2,5-dione
23. 9-methyl-3,4-dihydro-4-(4-chlorophenyl)-1H-1,4-benzodiazepine-2,5-dione
24. 8-methyl-3,4-dihydro-4-(4-methylphenyl)-1H-1,4-benzodiazepine-2,5-dione Upon substituting the above compounds in Example 1 in place of the 4-phenyl-3,4-dihydro-1H-1,4-benzodiazepine-2,5-dione one obtains the following 2. 6-chloro-2,3,4,5-tetrahydro-4-phenyl-1H-1,4-benzodiazepine-1-carboximidamide, hydrochloride
3. 7-bromo-2,3,4,5-tetrahydro-4-phenyl-1H-1,4-benzodiazepine-1-carboximidamide, hydrochloride
4. 8-fluoro-2,3,4,5-tetrahydro-4-phenyl-1H-1,4-benzodiazepine-1-carboximidamide, hydrochloride
5. 9-trifluoromethyl-2,3,4,5-tetrahydro-4-phenyl-1H-1,4-benzodiazepine-1-carboximidamide, hydrochloride
6. 6-methyl-2,3,4,5-tetrahydro-4-phenyl-1H-1,4-benzodiazepine-1-carboximidamide, hydrochloride
7. 7-ethyl-2,3,4,5-tetrahydro-4-phenyl-1H-',4-benzodiazepine-1-carboximidamide, hydrochloride
8. 9-propyl-2,3,4,5-tetrahydro-4-phenyl-1H-1,4-benzodiazepine-1-carboximidamide, hydrochloride
9. 6-t-butyl-2,3,4,5-tetrahydro-4-phenyl-1H-1,4-benzodiazepine-1-carboximidamide, hydrochloride
10. 6-methoxy-2,3,4,5-tetrahydro-4-phenyl-1H-1,4-benzodiazepine-1-carboximidamide, hydrochloride
11. 8-ethoxy-2,3,4,5-tetrahydro-4-phenyl-1H-1,4-benzodiazepine-1-carboximidamide, hydrochloride
12. 9-i-propoxy-2,3,4,5-tetrahydro-4-phenyl-1H-1,4-benzodiazepine-1-carboximidamide, hydrochloride
13. 6-t-butoxy-2,3,4,5-tetrahydro-4-phenyl-1H-1,4-benzodiazepine-1-carboximidamide, hydrochloride
14. 2,3,4,5-tetrahydro-4-(4-chlorophenyl)-1H-1,4-benzodiazepine-1-carboximidamide, hydrochloride
15. 2,3,4,5-tetrahydro-4-(2-bromophenyl)-1H-1,4-benzodiazepine-1-carboximidamide, hydrochloride
16. 2,3,4,5-tetrahydro-4-(4-trifluoromethylphenyl)-1H-1,4-benzodiazepine-1-carboximidamide, hydrochloride
17. 2,3,4,5-tetrahydro-4-(4-methylphenyl)-1H-1,4-benzodiazepine-1-carboximidamide, hydrochloride
18. 2,3,4,5-tetrahydro-4-(3-ethylphenyl)-1H-1,4-benzodiazepine-1-carboximidamide, hydrochloride
19. 2,3,4,5-tetrahydro-4-(2-methoxyphenyl)-1H-1,4-benzodiazepine-1-carboximidamide, hydrochloride
20. 2,3,4,5-tetrahydro-4-(4-ethoxyphenyl)-1H-1,4-benzodiazepine-1-carboximidamide, hydrochloride
21. 6-chloro-2,3,4,5-tetrahydro-4-(4-methylphenyl)-1H-1,4-benzodiazepine-1-carboximidamide, hydrochloride 22. 7-chloro-2,3,4,5-tetrahydro-4-(4-methoxyphenyl-1H-1,4-benzodiazepine-1-carboximidamide, hydrochloride
23. 9-methyl-2,3,4,5-tetrahydro-4-(4-chlorophenyl)-1H-1,4-benzodiazepine-1-carboximidamide, hydrochloride
24. 8-methyl-2,3,4,5-tetrahydro-4-(4-methylphenyl)-1H-1,4-benzodiazepine, carboximidamide, hydrochloride

EXAMPLE 25

2,3,4,5-Tetrahydro-4-phenyl-1H-1,4-benzodiazepine-1-carboximidamide, methochloride The hydrochloride salt of Example 1 is basified by treatment with $K_2CO_3$. A solution of the base in MeCN is cooled and treated with methyl chloride. The solution is allowed to stand for one day and the solvent is evaporated to give 2,3,4,5-tetrahydro-4-phenyl-1H-1,4-benzodiazepine-1-carboximidamide, methochloride.

What is claimed is:
1. A compound of the formula

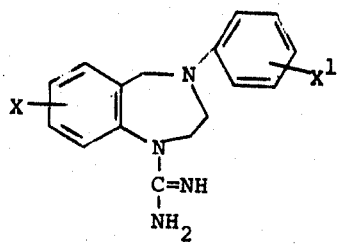

wherein X and $X^1$ are independently selected from the group consisting of hydrogen, lower alkyl, lower alkoxy, halo, and trifluoromethyl and the acid-addition and quaternary salts thereof.

2. The compound of claim 1 wherein the lower alkyl and lower alkoxy are of 1 to 4 carbon atoms.

3. The compound of claim 2 wherein X and $X^1$ are different.

4. The compound of claim 2 wherein X and $X^1$ are the same.

5. The compound of claim 4 wherein X and $X^1$ are both hydrogen.

6. The compound of claim 5 having the name 2,3,4,5-tetrahydro-4-phenyl-1H-1,4-benzodiazepine-1-carboximidamide, hydrochloride.

7. The method of producing the compound of claim 1 comprising reducing a compound of the formula

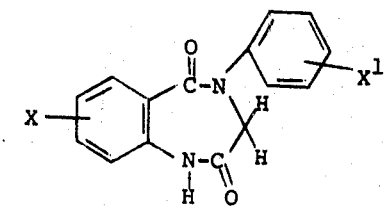

with a strong reducing agent, converting this intermediate to its acid-addition salt form, and reacting with cyanamide by heating.

* * * * *

UNITED STATES PATENT OFFICE
CERTIFICATE OF CORRECTION

PATENT NO. : 3,869,447
DATED : March 4, 1975
INVENTOR(S) : John Krapcho

It is certified that error appears in the above-identified patent and that said Letters Patent are hereby corrected as shown below:

Col. 1, line 26, "carbn" should read --carbon--.

Col. 4, line 23, "1H-',4" should read --1H-1,4--.

Col. 6, line 5, delete "the" at its second occurrence.

Signed and sealed this 24th day of June 1975.

(SEAL)
Attest:

RUTH C. MASON
Attesting Officer

C. MARSHALL DANN
Commissioner of Patents
and Trademarks